United States Patent
Schiff et al.

(10) Patent No.: US 9,625,901 B2
(45) Date of Patent: Apr. 18, 2017

(54) MONITORING SYSTEM FOR A GAS TURBINE ENGINE

(71) Applicant: SOLAR TURBINES INCORPORATED, San Diego, CA (US)

(72) Inventors: Garrett Linn Schiff, San Diego, CA (US); Thompson Hoang An Pham, San Diego, CA (US); Fabrice Mario Murgia, San Diego, CA (US); Neal Watkins, Chula Vista, CA (US); Vijaya Shankar Sadasivan, San Diego, CA (US); Ramanath Vasamsetty, San Diego, CA (US); Pankaj Yogendra Tiwari, San Diego, CA (US); Frances Julia Kemp, San Diego, CA (US); Anbarasu Sanjeevi, San Diego, CA (US); Andrea Monti, San Fedele Intelvi (IT); Alessio De Stefano, Lugano (IT); James Anthony Gilbert, San Diego, CA (US); Marco Ezra Leon, San Diego, CA (US); Venkatesh Canchi, San Diego, CA (US); Paul F Cameron, San Diego, CA (US); Joseph Stinson McElhinney, IV, San Diego, CA (US); Miguel J Estupinan, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 0 days.

(21) Appl. No.: 14/843,446

(22) Filed: Sep. 2, 2015

(65) Prior Publication Data
US 2017/0039836 A1    Feb. 9, 2017

Related U.S. Application Data

(60) Provisional application No. 62/201,047, filed on Aug. 4, 2015.

(51) Int. Cl.
*G05B 23/00* (2006.01)
*G05B 23/02* (2006.01)

(52) U.S. Cl.
CPC ......... *G05B 23/00* (2013.01); *G05B 23/0213* (2013.01)

(58) Field of Classification Search
CPC .... G05B 23/02; G05B 23/0213; G05B 23/00; G05B 23/0216; F01D 3/00; F01D 21/00;
(Continued)

(56) References Cited

U.S. PATENT DOCUMENTS 6,199,018 B1 *  3/2001  Quist ................. G01M 13/028
                                                              318/806
6,297,742 B1 * 10/2001  Canada ................ G01R 31/343
                                                              318/490
(Continued)

*Primary Examiner* — Van Trieu
(74) *Attorney, Agent, or Firm* — Procopio, Cory, Hargreaves & Savitch, LLP

(57) ABSTRACT

A method of monitoring a plurality of turbomachines is disclosed herein. In embodiments, the method includes a fleet data system receiving first event data from a first monitoring connection system and second event data from a second monitoring connection system. The method also includes the fleet data system determining from the first event data and the second event data whether an event has occurred. The method further includes the fleet data system issuing an alert when the fleet data system has determined that the event has occurred, the alert including an event name, an event status, and a timestamp related to when the event occurred.

14 Claims, 8 Drawing Sheets

(58) Field of Classification Search
CPC .. F01D 21/003; F05D 2260/80; G06F 11/079; G06F 11/0721; G01D 21/02
See application file for complete search history.

(56) References Cited

U.S. PATENT DOCUMENTS

| | | | | |
|---|---|---|---|---|
| 6,349,252 | B1* | 2/2002 | Imanishi | E02F 9/267 |
| | | | | 701/32.7 |
| 9,267,378 | B2* | 2/2016 | Delvaux | F01D 21/003 |
| 2006/0100797 | A1* | 5/2006 | Poorman | G01H 1/00 |
| | | | | 702/56 |
| 2013/0304385 | A1* | 11/2013 | Gillette, II | G01N 33/0009 |
| | | | | 702/6 |
| 2014/0003905 | A1* | 1/2014 | Delvaux | F01D 21/003 |
| | | | | 415/1 |
| 2016/0034329 | A1* | 2/2016 | Larson | G01D 21/02 |
| | | | | 702/188 |

\* cited by examiner

MONITORING SYSTEM FOR A GAS TURBINE ENGINE

RELATED APPLICATIONS

The present application claims the benefit of U.S. Provisional Application No. 62/201,047 filed on Aug. 4, 2015 and titled Monitoring System for Turbomachinery.

TECHNICAL FIELD

The present disclosure generally pertains to turbomachinery, and is directed toward a monitoring system for turbomachinery and associated equipment.

BACKGROUND

Turbomachinery, such as gas turbine engines and associated equipment can be controlled and monitored by a control system of the gas turbine engine. Equipment associated with the gas turbine engine can include, inter alia, gas compressors, gearboxes, and fuel systems.

The present disclosure is directed toward overcoming one or more of the problems discovered by the inventors or that is known in the art.

SUMMARY OF THE DISCLOSURE

A method of monitoring a plurality of turbomachines is disclosed herein. In embodiments, the method includes a first monitoring connection system periodically receiving first event data from a first control system for a first turbomachine of the plurality of turbomachines. The method also includes a second monitoring connection system periodically receiving second event data from a second control system for a second turbomachine of the plurality of turbomachines. The method further includes a fleet data system receiving the first event data from the first monitoring connection system and the second event data from the second monitoring connection system. The method yet further includes the fleet data system determining from the first event data and the second event data whether an event has occurred. The method still further includes the fleet data system issuing an alert when the fleet data system has determined that the event has occurred, the alert including an event name, an event status, and a timestamp related to when the event occurred.

DETAILED DESCRIPTION

Figure 1:
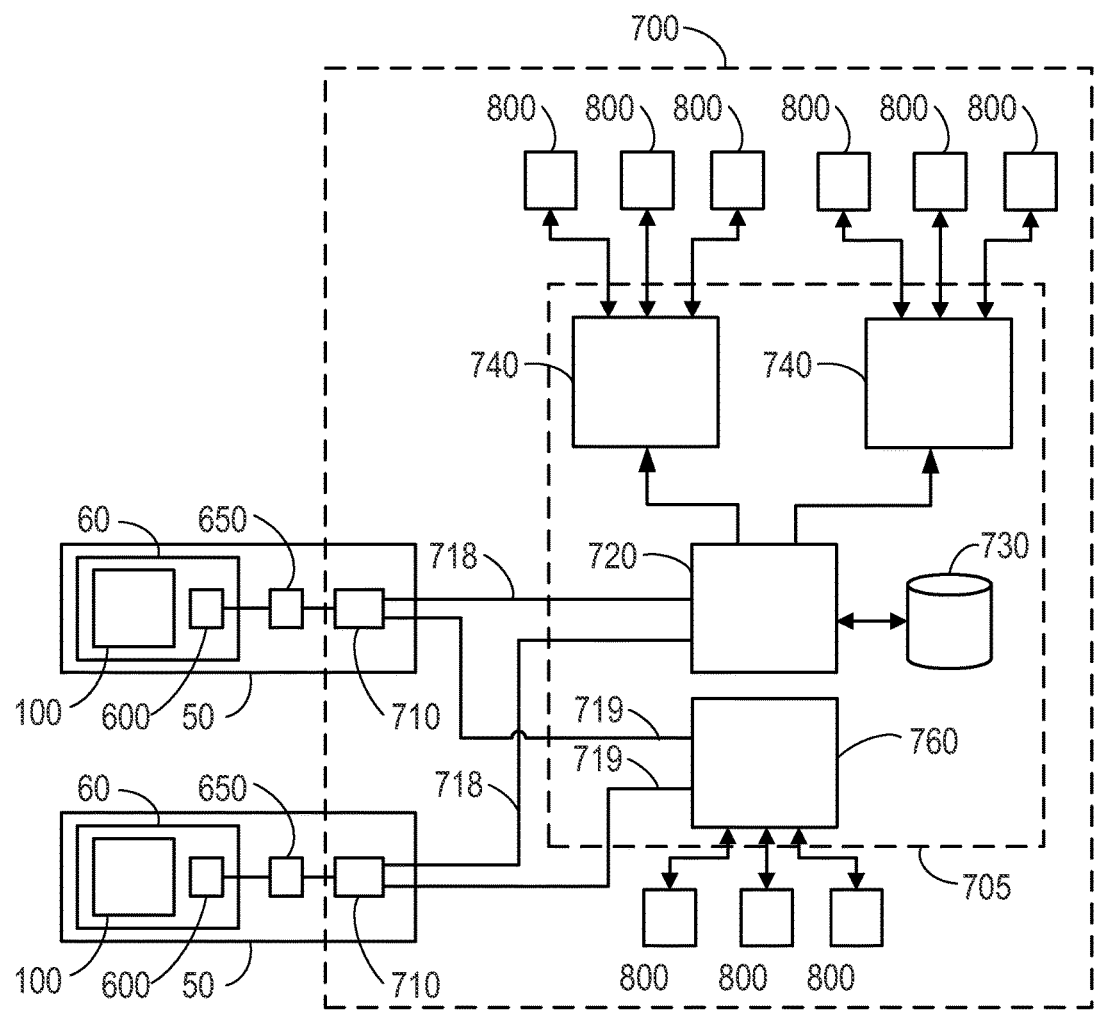
FIG. 1 is a schematic illustration of multiple turbomachinery systems connected to a monitoring system.

FIG. 1 is a schematic illustration of multiple turbomachinery systems 50 connected to a monitoring system 700. Each turbomachinery system 50 may include a turbomachinery package 60, a firewall 650, a monitoring connection system 710, and sensors connected thereto. The turbomachinery package 60 includes a turbomachine, such as gas turbine engine 100, and a control system 600 that monitors and controls that turbomachine. Each turbomachinery system 50 may be located at a customer site.

The monitoring system 700 includes a monitoring system data provider 720, a monitoring system data store 730, monitoring system servers 740, a fleet data system 760, monitoring devices 800, and the monitoring connection systems 710 of the turbomachinery systems 50. The monitoring system data provider, the monitoring system servers 740 and the fleet data system 760 may be located at a central data center 705 remote from the turbomachinery systems 50. While the monitoring system data provider 720 and the fleet data system 760 are shown as separate devices, in some embodiments, the monitoring system data provider 720 and the fleet data system 760 are modules on the same system, such as a server. The monitoring system data provider 720 and the fleet data system 760 are connected to each monitoring connection system 710 over a network.

The monitoring system data provider 720 receives an analog data stream 718 from the monitoring connection system 710 that may includes, inter alia, data related to the various sensors connected to the turbomachine, such as the gas turbine engine 100 and to equipment associated with the turbomachine, gas compressors, gearboxes, fuel systems, batteries, lube oil, enclosure temperatures, driven equipment, electric motor drives, balance of plant, and other systems connected to or on the turbomachinery package 60. The analog data stream 718 may be a single real time data stream. The monitoring system data provider 720 may include a monitoring system data store 730 for storing the information received from the analog data stream 718. The monitoring system data store 730 may be a fast cache, which may allow immediate access to the data as it is stored so that the data can then be sent immediately to the monitoring system servers 740 from the monitoring system data provider 720.

The monitoring system servers 740 are configured to receive the data of the analog data stream 718 from the monitoring system data provider 720 and provide the data of at least one turbomachinery system 50 to at least one monitoring device 800. Each monitoring device 800 is configured to display the information to a user, such as an operator, an engineer, or owner of the gas turbine engine 100.

The fleet data system 760 receives an event data stream 719 from the monitoring connection system 710 that includes, inter alia, data related to the various events, such as status bits, alerts, and alarms, related to the turbomachinery and associated equipment monitored by the control system 600. Depending on the type of event, the fleet data system 760 provides the event related data to the monitoring devices 800, sends a notification to a predetermined user, or does both. The monitoring devices 800 receives the sensor data from the monitoring system data provider 720 and the event data from the fleet data system 760 including receiving alerts for predetermined events as the events occur.

Figure 2:
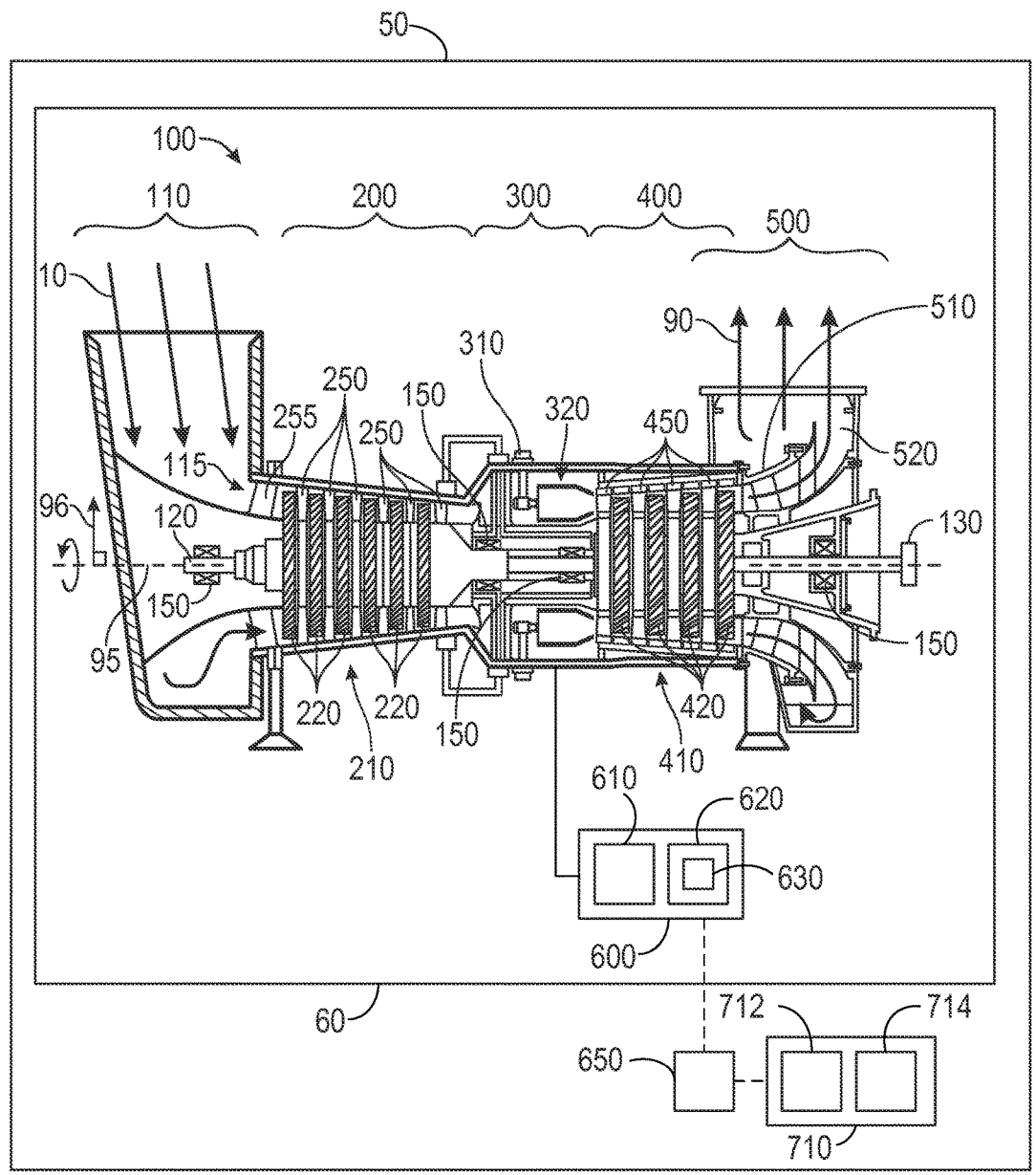
FIG. 2 is a schematic illustration of the turbomachinery system of FIG. 1 including a gas turbine engine.

FIG. 2 is a schematic illustration of an exemplary turbomachinery system 50 including a gas turbine engine 100. The gas turbine engine 100 described herein is merely exemplary in nature and is not intended to limit the invention or the application and uses of the invention. It will be appreciated that other turbomachinery, such as gas compressors and pumps, can be implemented in various configurations within the turbomachinery system 50. Referring to FIG. 2, some of the surfaces have been left out or exaggerated for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow direction, and aft is "downstream" relative to primary air flow direction.

In addition, the disclosure may generally reference a center axis 95 of rotation of the gas turbine engine 100, which may be generally defined by the longitudinal axis of its shaft 120 (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from, wherein a radial 96 may be in any direction perpendicular and radiating outward from center axis 95.

The gas turbine engine 100 includes an inlet 110, a shaft 120, a gas producer or compressor 200, a combustor 300, a turbine 400, an exhaust 500, and a power output coupling 130. The gas turbine engine 100 may have a single shaft or a dual shaft configuration.

The compressor 200 includes a compressor rotor assembly 210, compressor stationary vanes ("stators") 250, and inlet guide vanes 255. The compressor rotor assembly 210 mechanically couples to shaft 120. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages. Inlet guide vanes 255 axially precede the first compressor stage.

The combustor 300 includes one or more fuel injectors 310 and a combustion chamber 320.

The turbine 400 includes a turbine rotor assembly 410 and turbine nozzles 450. The turbine rotor assembly 410 mechanically couples to the shaft 120. As illustrated, the turbine rotor assembly 410 is an axial flow rotor assembly. The turbine rotor assembly 410 includes one or more turbine disk assemblies 420. Each turbine disk assembly 420 includes a turbine disk that is circumferentially populated with turbine blades. A turbine nozzle 450, such as a nozzle ring, axially precedes each of the turbine disk assemblies 420. Each turbine nozzle 450 includes multiple methods grouped together to form a ring. Each turbine disk assembly 420 paired with the adjacent turbine nozzle 450 that precede the turbine disk assembly 420 is considered a turbine stage. Turbine 400 includes multiple turbine stages.

The exhaust 500 includes an exhaust diffuser 510 and an exhaust collector 520.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as HASTELLOY, INCONEL, WASPALOY, RENE alloys, HAYNES alloys, INCOLOY, MP98T, TMS alloys, and CMSX single crystal alloys.

Control system 600 includes a controller 610 and a human machine interface system (HMI) 620. The controller 610 is configured to obtain the values of various sensors connected to the gas turbine engine 100 and to monitor the gas turbine engine 100. The sensors may include, inter alia, various temperature sensors, pressure sensors, flow meters, and the like. The sensors may be used to monitor the temperature of the turbine 400, such as the inlet of the power turbine of a gas turbine engine 100 with a dual shaft configuration, the shaft speed, the load output, and various aspects of the fuel flowing to the fuel injectors 310. These aspects may include the upstream and downstream pressures and temperatures of the fuel relative to the control valve that is used to meter fuel flow to the fuel injectors 310, and the mass flow rate of the fuel. The controller 610 may monitor the gas turbine engine 100 for events, such as trigger events, alarms, and shutdowns of the gas turbine engine 100.

The HMI 620 includes a high speed recorder (HSR) 630 that is configured to obtain and log the values of the sensors and the status bits of the event types monitored by the controller 610, including trigger events, such as events related to the operating cycle of the gas turbine engine (start-up, shut-down, change of load, etc.), and alarms generated by the control system 600. The HMI 620 may be connected to a monitoring connection system 710. In the embodiment illustrated, a firewall 650 is connected between the HMI 620 and the monitoring connection system 710. In other embodiments, the firewall 650 is connected between the controller 610 and the HMI 620, and between the controller 610 and the monitoring connection system 710. In these embodiments, the HMI 620 and the monitoring connection system 710 may be connected in parallel. The firewall 650 may be a read only firewall for the controller 610 to prevent remote access to the controller 610.

The monitoring connection system 710 may include a connection system module 712 and a connection system gateway 714. The connection system module 712 is configured to obtain the sensor data and the event data from the control system 600 and provide that data to the monitoring system data provider 720 and the fleet data system 760 respectively using the connection system gateway 714. In the embodiment illustrated, the connection system module 712 obtains the sensor data and the event data from the HMI 620. In other embodiments, the connection system module 712 obtains the sensor data and the event data directly from the controller 610.

Figure 3:
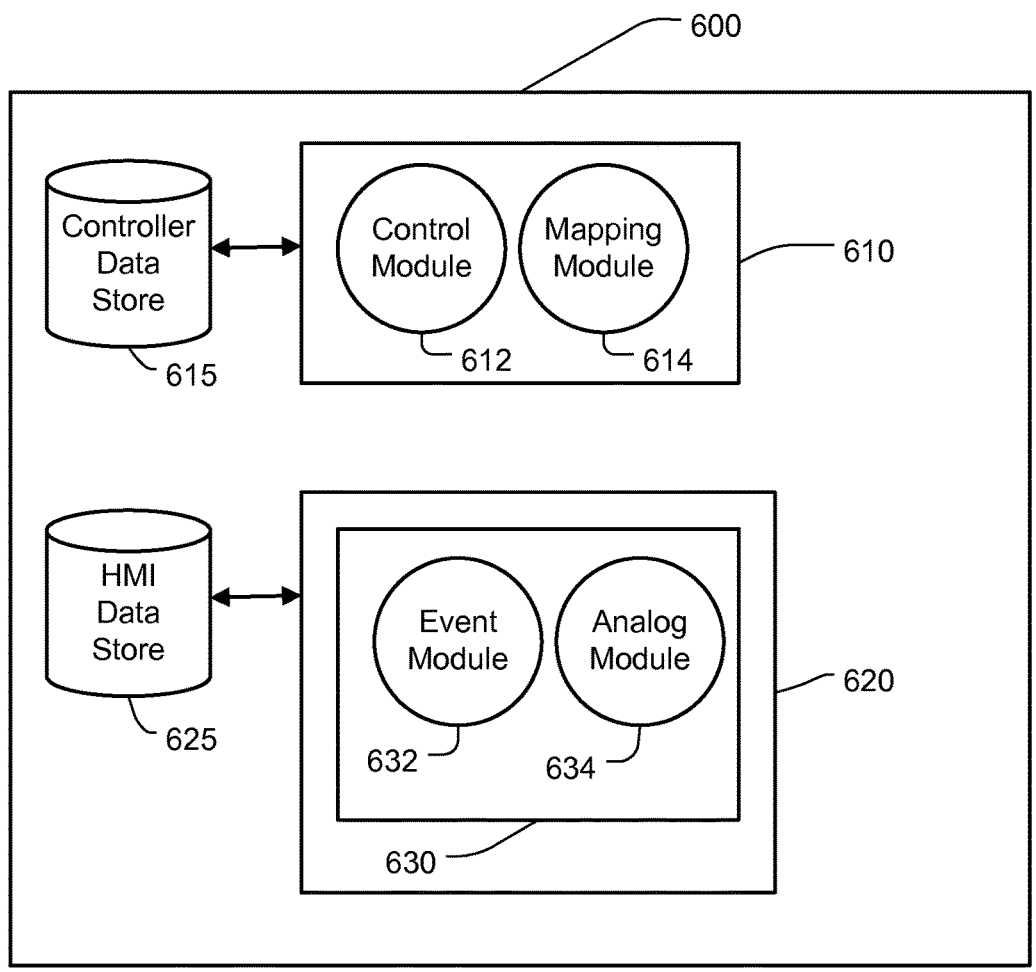
FIG. 3 is a functional block diagram of the control system of FIG. 2.

FIG. 3 is a functional block diagram of the control system 600 of FIG. 2. The controller 610 may include a control module 612 and a mapping module 614. The control module 612 is configured to control the gas turbine engine 100 during operation of the gas turbine engine 100. The control module 612 may use the values obtained from various sensors to control the gas turbine engine 100 through, inter alia, modifying the angular position of the fuel control valve and of the inlet guide vanes.

The mapping module 614 is configured to log an array related to, inter alia, each event and the values obtained from each sensor. A tag may be assigned to, inter alia, each event type and each sensor, to identify the recorded value. Each tag may be associated with a tag name and a unique identifier to identify the associated tag. Each unique identifier may be a recorded value within the array. The unique identifier may be a numeric number used to identify the tag. The tags may be unique to a given gas turbine engine 100 or to a given set of gas turbine engines 100. For example, each model type of an original equipment manufacturer's gas turbine engines 100 may have a unique set of tags that are used for the various event types and sensors.

The recorded value of event status bits may be a Boolean value to identify between two different states of the event. When an event occurs, the unique identifier and the recorded value may be packed into 32 bit words, which may then be packed into the array. For values obtained from the sensors, the recorded value may be a floating point value obtained from a sensor. In embodiments, these values are analog values obtained from the sensors. When a sensor is sampled, the unique identifier and the recorded value may be packed into 32 bit words, which may then be packed into the array. In some embodiments, the array may be separated into an event array and into an analog value array. The unique identifiers and the recorded values for events are packed into the event array, and the unique identifiers and the recorded values obtained from the sensors are packed into the analog value array.

A timestamp may also be recorded for each event and for each analog value obtained from the sensors. The timestamp is a temporal value, such as the date and time of day, that the event occurred or when the value was sampled. The timestamp may be obtained from the time clock of the controller or by other methods and packed into the array along with the unique identifier and the recorded value.

The control system 600 may include a controller data store 615. The controller data store 615 may be used to store the most recently obtained values for the timestamp and the recorded value for each tag.

The HSR 630 includes an event module 632 and an analog module 634. The mapping module 614 may publish the event data, such as the event array, on a loop cycle over a first predetermined interval. The event module 632 may be configured to read the event data as soon as it is published and provide that data to the connection system module 712. The event module 632 may provide the event data to the connection system module 712 on the first predetermined interval.

The analog module 634 may operate in parallel with the event module 632. The analog module 634 is configured to read the values obtained for each sensor from the controller 610 on a second predetermined interval, such as once every 100 milliseconds. The analog module may be configured to read the analog array and provide the analog array to the connection system module 712. The second predetermined interval may be a shorter interval than that of the first predetermined interval. The analog module 634 may assign a timestamp to each value obtained from the controller 610 and record the timestamp in the analog array.

Control system 600 may also include an HMI data store 625. The HMI data store 625 may be used by the HMI 620 and its various modules to store, inter alia, the data read from the controller 610

In the embodiment illustrated in FIGS. 1 and 2, the connection system module 712 sends the event array, the array of event data, to the fleet data system 760 in the event data stream 719 and the analog data array, the array of sensor data, to the monitoring system data provider in the analog data stream 718. In other embodiments, the connection system module 712 sends a single array that includes the event and analog data to the monitoring system data provider 720 in a single data stream. The event array is then provided to the fleet data system 760.

Figure 4:
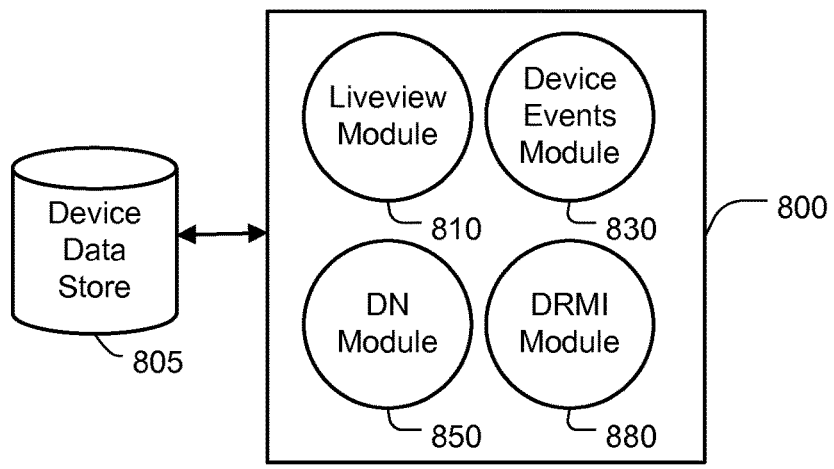
FIG. 4 is a functional block diagram of a monitoring device of FIG. 1.

FIG. 4 is a functional block diagram of a monitoring device 800 of FIG. 1. The monitoring device 800 may include a liveview module 810, a device events module 830, a device notification module (DN module) 850, and a device remote management module (DRMI module) 880. The liveview module 810 is configured to obtain the analog data from a monitoring system server 740 and display that analog data in real time. The device events module 830 is configured to obtain the event data from the fleet data system 760 and display the events that have occurred within a preselected timeframe. The DN module 850 is configured to connect to the fleet data system 760 to allow the user to select which types of notifications to receive and configure how the fleet data system 760 will notify the user. The DRMI module 880 is configured for remote machine provisioning capability, such as the ability to remotely update or configure the data acquisition software of the turbomachinery system 50. The DRMI module 880 may only be accessible to or provided to monitoring devices 800 of authorized users, such as project engineers for a service provider. In some embodiments, the DRMI module 880 may be located on one or more servers, such as the monitoring system data provider 720 or the monitoring system server 740.

Figure 5:
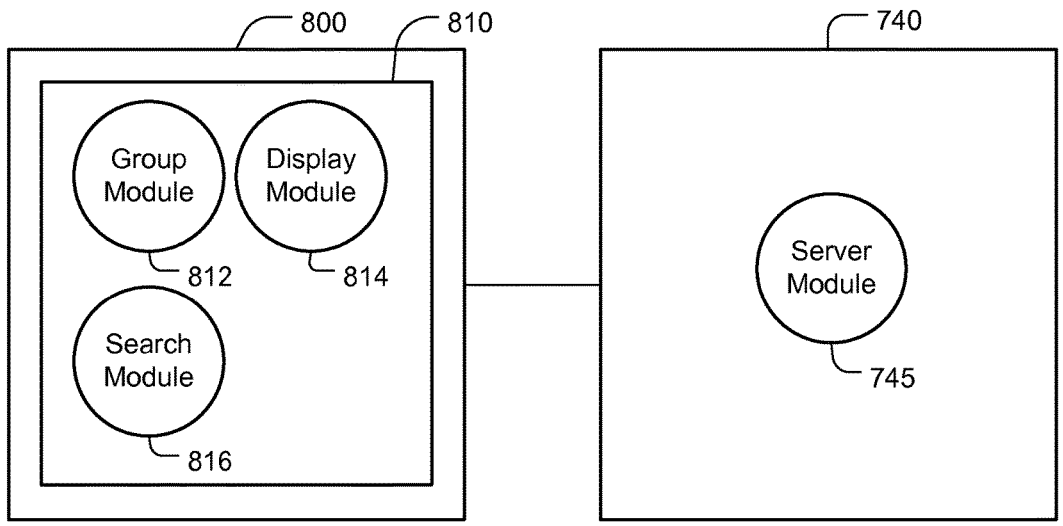
FIG. 5 is a functional block diagram of a monitoring device and a monitoring system server of FIG. 1.

FIG. 5 is a functional block diagram of a monitoring device 800 and a monitoring system server 740 of FIG. 1. As illustrated, the liveview module 810 may include a group module 812, a display module 814, and a search module 816. The monitoring system server 740 may include a server module 745. The liveview module 810 may connect to the monitoring system server 740 over a network and request the real time sensor data, such as a stream of the analog data array, sent to the monitoring system data provider 720 for a selected turbomachinery system 50.

The server module 745 may determine whether the monitoring device 800 can access the real time sensor data, may determine whether or not to handle the request, and may either process the request or transfer the request to another monitoring system server 740. Factors on whether to process the request or transfer the request may include the number of data streams the monitoring system server 740 is currently providing, and whether it or another monitoring system server 740 is currently providing a data stream for the selected turbomachinery system 50. When processing the request, the server module 745 obtains the real time sensor data from the monitoring system data provider 720 and sends the real time sensor data to the monitoring device 800.

As described previously, the sensor data for each gas turbine engine 100 has a set of tags that are used to identify the various sensors of the gas turbine engine 100. Depending on the model of gas turbine engine 100, the tag name and unique identifier for a given sensor may be different. Further, not all sensors used on one gas turbine engine 100 may be available on another gas turbine engine 100.

The tags can be organized into groups. These groups can include tags related to one another based on factors, such as the location of the sensors within the engine and which system or sub-system of the gas turbine engine 100 the sensor is related to. For the various types and models of gas turbine engines 100, each group and the tags within each group may be organized based the factors and on the availability of the tags within the gas turbine engine 100. Examples of the groups include generator power, fuel control mode, operation sequence, and the turbine. The generator power may include, inter alia, a tag for the total power output of the turbomachine, and the fuel control mode may include, inter alia, a tag for the maximum fuel of the turbomachine. The liveview module 810 may include or have access to a list of the various groups associated with each model of gas turbine engine 100.

Some tags may be located within more than one group. Other tags may be unique to a group. One unique tag for each group may be identified as a critical tag. Each critical tag is associated with only one group. The critical tag may be used to determine whether the tags for a given group are available within the sensor data.

The group module 812 is configured to determine whether the tags for each of the groups are available in the sensor data received from the monitoring system server 740. The group module 812 may determine which tags for the groups are available by searching the sensor data for the critical tags and determining which of the critical tags are in the sensor data. The group module 812 may determine which of the critical tags are available by comparing the unique identifier of each critical tag for each of the groups with the unique identifiers for the tags in the sensor data. Once identified, the group module 812 may correlate the tags with the groups and provide the groups and the correlated tags to the display module 814.

The display module 814 may be configured to dynamically display a set of groups including the tag names and the recorded values for the tags of those groups on an output display of the monitoring device 800. Sets of groups may be organized to provide various summaries of the gas turbine engine 100 operation and to display information related to a given system of the gas turbine engine 100. Examples of sets of groups include an operation summary, an engine summary, and the fuel system. The display module 814 may determine which set of groups to display based on a user selected input.

The display module 814 may dynamically display a set of groups by obtaining the size of the output display, determining the size of each group including the number of tags in each group, and organizing the groups within the display to limit the white space on the screen. The horizontal white space in the output display may be limited by selecting the optimal number of columns to display. The number of columns to display may depend on the width of the display device. As the display size including the width increases, more columns can be used to fill the display space. The vertical white space in each column can be limited by minimizing the difference in the number of tags displayed in each column.

For example, a set of groups may include four groups including a first group with 3 tags, a second group with 5 tags, a third group with 6 tags, and a fourth group with 7 tags. The output display on a tablet sized monitoring device 800 may be wide enough to display two columns. The display module 814 may configure the first column to display the first and fourth groups and configure the second column to display the second and third groups. However, the output display for a cellular phone sized monitoring device 800 may only be wide enough to display a single column. The display module 814 may configure all four groups to be displayed in a single and scrollable column.

In some embodiments, the display module 814 may also be configured to display all of the tags in a scrollable list. The tags may be organized by tag name and may be displayed in one or more columns.

Search module 816 is configured to locate and display a tag based on one or more search terms input by a user. A tag may be identified based on, inter alia, the tag name, unique identifier, and groups the tag is associated with.

Figure 6:
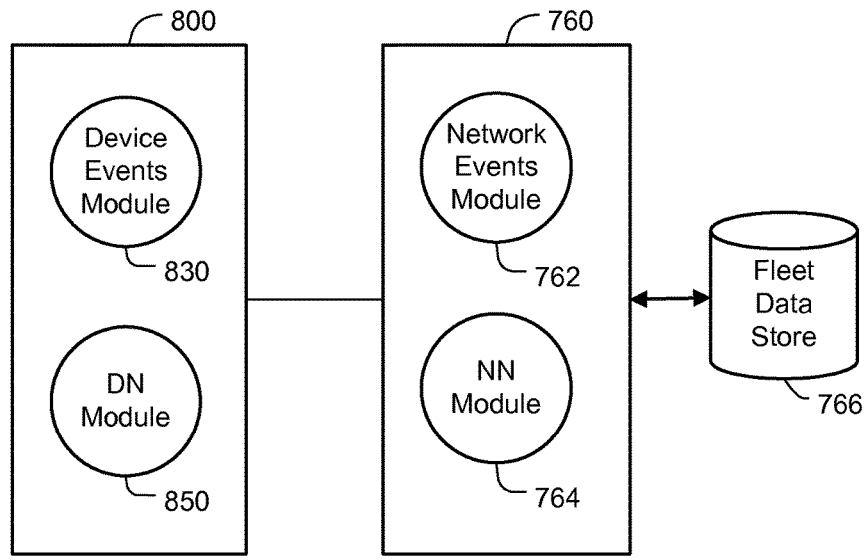
FIG. 6 is a functional block diagram of a monitoring device and the fleet data system of FIG. 1.

FIG. 6 is a functional block diagram of a monitoring device 800 and the fleet data system 760 of FIG. 1. As previously mentioned, the monitoring device 800 may include a device events module 830 and a DN module 850. The fleet data system 760 may include a network events module 762, a network notifications (NN) module 764, and a fleet data store 766. The device events module 830 is configured to obtain the data of events that have occurred over a selected timeframe, such as the last one or more months, the last one or more years, a calendar month, or a calendar year, from the network events module 762 and display the information related to those events on an output display of the monitoring device 800.

The network events module 762 is configured to receive the event data stream 719 from the monitoring connection system 710 (refer FIG. 1) and store the data related to those events that have occurred over a predetermined timeframe, such as a predetermined number of months or a predetermined number of years, in the fleet data store 766. The data related to events may include the tag, the unique identifier, a description of the tag, one or more time stamps related to when the event occurred, and an event type.

The network events module 762 is further configured to receive a request from the device events module 830 for the data of events that have occurred over the selected timeframe, to determine whether the monitoring device 800 can access the data for those events of a selected gas turbine engine 100, and provide the data for those events that have occurred within the selected timeframe. In some embodiments, the network events module 762 provides the data for the events that have occurred over the predetermined timeframe and the device events module 830 filters the data and only displays the information related to the events that have occurred within the selected timeframe. In other embodiments, the network events module 762 pre-filters the data and only sends the information related to the events that have occurred within the selected timeframe. The selected timeframe may be determined by user input.

In some embodiments, the event information may also be filtered and displayed by event type. The device events module 830 may be configured to display only the events related to the event types currently selected by a user. In some embodiments, the device events module 830 establishes a connection to the network events module 762 and the device events module 830 requests the event data for the events that have occurred within the selected timeframe from the network events module 762 when the connection is established.

The NN module 764 is configured to issue an alert to the DN module 850 to notify a user of when an event occurs. The alert may include the event name, the event status and the timestamp related to when the event occurred. The NN module 764 may use one or more methods for notifying the user including push notifications, such as pushing the notification to the DN module 850 which is configured to display the notification on the monitoring device 800, email notifications, such as emailing the notification to the user, or text notifications, such as sending the notification to the user via a text message. The text message may be sent via short message service (SMS), data, or both. The text message may also be sent via a text messaging service or application. The DN module 850 may instruct the NN module 764 on how to send the alert to the monitoring device 800 and which type of alert to send to the monitoring device 800.

The NN module 764 may be configured to compare the event status of the tags for the most recently received event data with the event status of the tags for the event data received in the period prior to the most recently received event data for each of the tags in the event data to determine whether the event has occurred. In embodiments, event status is a Boolean value and the NN module 764 checks for Boolean values in the tags that change from a value that represents an inactive state to a value that represents an active state to compare the event status for each of the tags.

The DN module 850 may be configured to accept a user's input to allow a user to select which event types, such as status bits, alarms, and shutdowns, will trigger a notification, to accept a user's input to allow a user to select which type of notification will be used, and to send those selections to the NN module 764. The NN module 764 may be configured to use the selections to determine when and how to send a notification to the user.

Figure 7:
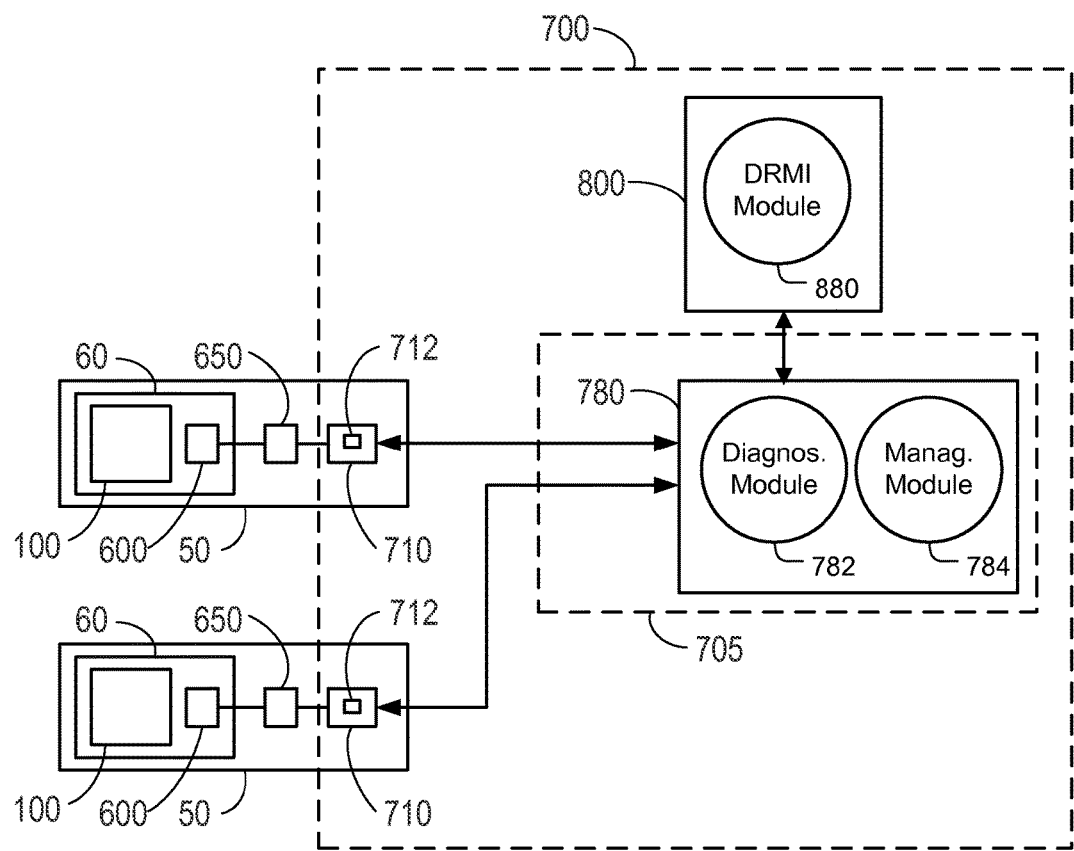
FIG. 7 is a schematic illustration of multiple turbomachinery system connected to a second portion of the monitoring system of FIG. 1.

FIG. 7 is a schematic illustration of multiple turbomachinery system 50 connected to the monitoring system 700 of FIG. 1. As illustrated in FIG. 7, the monitoring system 700 may also include a network remote management tools module (NRMI) 780. The NRMI module 780 may be located in the data center 705 and may run on one or more machines, such as servers located in the data center 705. In some embodiments, the NRMI module 780 may be implemented on the monitoring system data provider 720 or the fleet data system 760.

The NRMI module 780 may include a diagnostic module 782 and a management module 784. Referring to FIGS. 1 and 7, the diagnostic module 782 may be configured to obtain and monitor the status details of the monitoring system 700 including the monitoring connection systems 710 including the connection system module 712, the monitoring system data provider 720, and the fleet data system 760. The status details may include the network connectivity status of the monitoring connection system 710 to the remainder of the monitoring system 700, the data acquisition status of the monitoring connection system 710 from the control system 600, the data posting status of the monitoring connection system 710 to the remainder of the monitoring system 700 including the monitoring system data provider 720 and the fleet data system 760, system status of the overall monitoring system 700, the performance status of the monitoring connection system 710 including the CPU and RAM usage, and the service status of the data center 705 including the monitoring system data provider 720, the monitoring system servers 740, and the fleet data system 760. The diagnostic module 782 may be configured to diagnose and report the status of each including any errors associated therewith.

In some embodiments, the diagnostic module 782 is also configured to monitor and diagnose the turbomachinery system 50. In these embodiments, monitoring the data acquisition status may further include monitoring the data acquisition of the HMI 620 from the controller 610 and of the controller 610 from the various sensors. In these embodiments, the diagnostic module 782 may be configured to receive the sensor data and the event data and to diagnose the turbomachinery system 50 based on, inter alia, the sensor data and the event data ant to report the status of one or more systems and sub-systems of the turbomachinery system 50.

The management module 784 may be configured to remotely manage including, inter alia, troubleshooting, updating, and maintaining the monitoring system 700 including the monitoring connection system 710, the monitoring system data provider 720, the monitoring system servers 740, the fleet data system 760 and the various modules associated therewith. Managing the monitoring connection system 710 may include remotely managing the network connectivity, the data acquisition, and performance of the monitoring connection system 710. Updating the monitoring connection system 710 may include updating the connection system module 712 by onboarding the connection system module 712 from the NRMI module 780 to the monitoring connection system 710.

Managing the monitoring system data provider 720 and the fleet data system 760 may include managing the data posting of each. Managing the monitoring system servers 740 may include managing the service and connectivity of the monitoring system servers 740 to the monitoring devices 800 including troubleshooting the display performance of the monitoring devices 800. The management module 784 may also provide recommendations to the user to schedule maintenance or further diagnostics of the turbomachinery system 50. In some embodiments, providing recommendations includes sending the recommendation to a monitoring device 800 with the NN module 764.

The DRMI module 880 may be configured to receive the status details from the NRMI module 780 and to display those details to an authorized user on an output display of the monitoring device 800. The DRMI module 880 may also be configured remotely manage the monitoring system 700 through the NRMI module 780. The DRMI module 880 may receive setup inputs, configuration inputs, and software updates from an authorized user and send those inputs and software updates to the NRMI module 780.

Based on the information obtained through the DRMI module 880, an authorized user may, inter alia, recommend service, part replacement, repairs, and further onsite diagnostics for the turbomachinery system 50. In some embodiments, the DRMI module 880 may interface with the NN module 764 to send those recommendations to a monitoring device 800, such as the monitoring device 800 of an owner or manager of the turbomachinery system 50. Further, a user, such as an engineer or a fleet manager, may recommend service, part replacement, repairs, and further onsite diagnostics for the turbomachinery system 50 based on the information received through one or more of the liveview module 810, the device events module 830, the DN module 850, and the NN module 764. These recommendations may also be provided using the NN module 764.

While the DRMI module 880 is illustrated with the liveview module 810, device events module 830, and DN module 850, the DRMI module 880 may be provided separately and may be located on a separate monitoring device 800.

INDUSTRIAL APPLICABILITY

Turbomachinery system 50 may be suited for any number of industrial applications such as various aspects of the oil and gas industry (including transmission, gathering, storage, withdrawal, and lifting of oil and natural gas), the power generation industry, cogeneration, aerospace, agricultural, mining, rail, construction, earthmoving, forestry, and other transportation industries.

Referring to FIG. 1, a gas (typically air 10) enters the inlet 110 as a "working fluid", and is compressed by the compressor 200. In the compressor 200, the working fluid is compressed in an annular flow path 115 by the series of compressor disk assemblies 220. In particular, the air 10 is compressed in numbered "stages", the stages being associated with each compressor disk assembly 220. For example, "4th stage air" may be associated with the 4th compressor disk assembly 220 in the downstream or "aft" direction, going from the inlet 110 towards the exhaust 500). Likewise, each turbine disk assembly 420 may be associated with a numbered stage.

Once compressed air 10 leaves the compressor 200, it enters the combustor 300, where it is diffused and fuel is added. Air 10 and fuel are injected into the combustion chamber 320 via fuel injector 310 and combusted. Energy is extracted from the combustion reaction via the turbine 400 by each stage of the series of turbine disk assemblies 420. Exhaust gas 90 may then be diffused in exhaust diffuser 510, collected and redirected. Exhaust gas 90 exits the system via an exhaust collector 520 and may be further processed (e.g., to reduce harmful emissions, and/or to recover heat from the exhaust gas 90).

During operation of a turbomachinery system 50 including a turbomachine, such as gas turbine engine 100, information relating to its operation is captured for controlling, monitoring, and performing diagnostics on the turbomachinery system 50. The data captured by the controller 610 may be read by the HSR 630 and logged in batches. These batches may be obtained by the monitoring system 700 through the monitoring connection system 710. The monitoring system 700 may be used to monitor and diagnose the turbomachinery system 50. The monitoring system 700 may provide raw data, statistics, notifications, and recommendations to engineers or to customers. The monitoring system 700 may also include analytic and diagnostic tools for further analysis and diagnostics of the turbomachinery system 50 and of the monitoring system 700.

Figure 8:
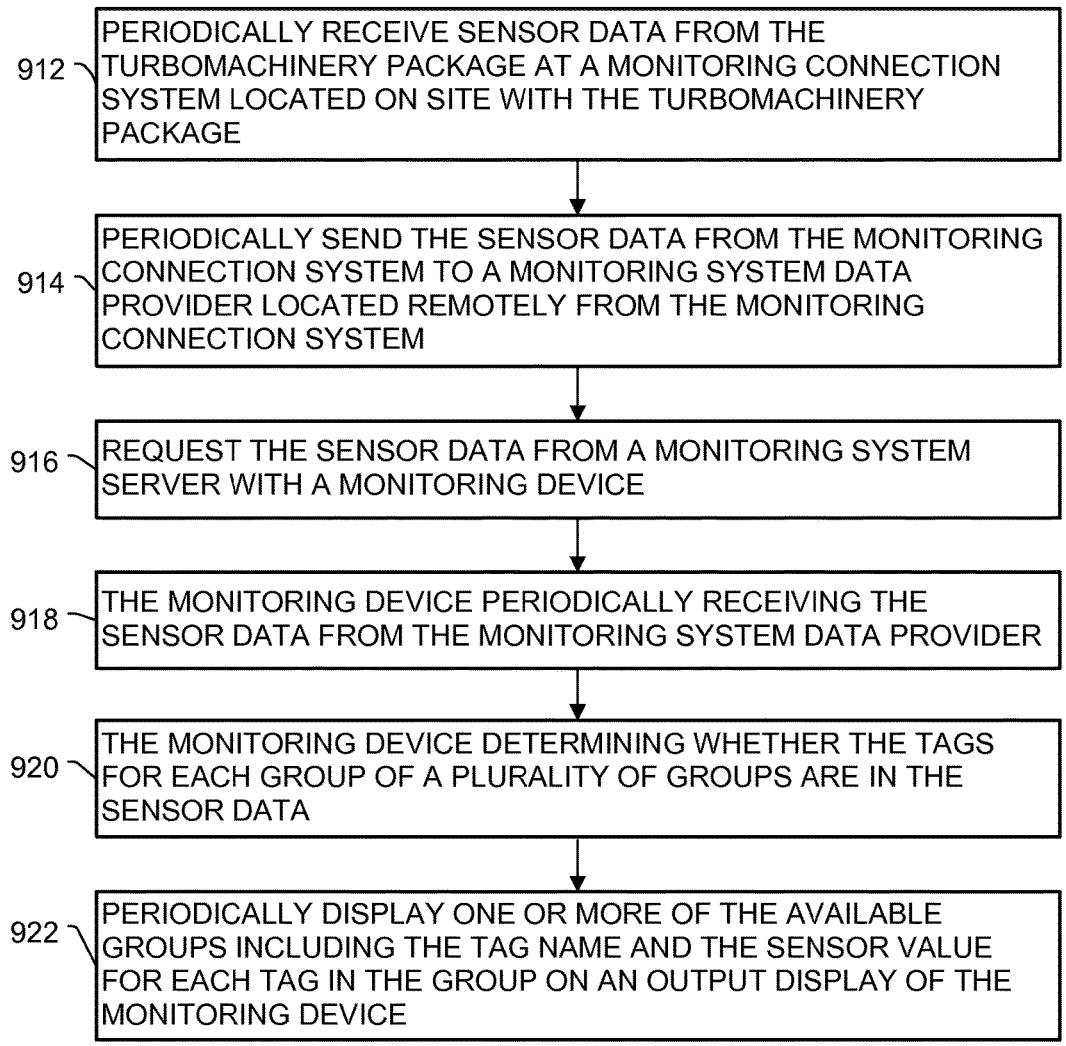
FIG. 8 is a flowchart of a method for remotely monitoring turbomachinery, such as the gas turbine engines 100 of FIGS. 1 and 2.

FIG. 8 is a flowchart of a method for remotely monitoring turbomachinery, such as the gas turbine engines 100 of FIGS. 1 and 2. The method includes periodically receiving sensor data from the turbomachinery package 60 at a monitoring connection system 710 located on site with the turbomachinery package 60 at step 912. The sensor data may include data related to sensors connected to systems and sub-systems associated with the turbomachinery package 60. The sensor data along with any other data received from the turbomachinery package 60 may pass through the firewall 650 to prevent remote access to the turbomachinery package 60. The sensor data may include multiple tags that include a tag name, a unique identifier, and a recorded value that represents the measurement made by the sensor. In some embodiments, a single site includes multiple turbomachinery packages 60. Step 912 may include receiving the sensor data from multiple turbomachinery packages 60 concurrently.

The method also includes periodically sending the sensor data from the monitoring connection system 710 to a monitoring system data provider 720 located remotely from the monitoring connection system 710 at step 914. The monitoring system data provider 720 may be located at a data center 705. Step 914 may include the monitoring system data provider 720 receiving the sensor data for multiple turbomachinery packages 60 from one or more monitoring connection systems 710.

The method may further include requesting the sensor data from a monitoring system server 740 with a monitoring device 800 at step 916. The method yet further includes the monitoring device 800 periodically receiving the sensor data from the monitoring system data provider 720 at step 918. The sensor data may travel from the monitoring system data provider 720 to the monitoring system server 740 and then to the monitoring device 800. Using multiple monitoring system servers 740 as intermediary devices may reduce the data flow and the bandwidth used by the monitoring system data provider 720 since multiple connections requesting the sensor data for the same gas turbine engine 100 can be done through the same monitoring system server 740.

The method still further includes the monitoring device 800 determining whether the tags for each group of a plurality of groups are in the sensor data at step 920. Step 920 may include determining whether a critical tag for each group of the plurality of groups is in the sensor data and correlating the tags with the groups that have the critical tag in the sensor data. The critical tag is unique to each group. Step 920 may also include comparing the unique identifier for each tag in the sensor data with the unique identifier for the critical tag of each group. All of the possible tags may be mapped and associated with one or more critical tags. The group module 812 may use the tag map to determine which tags are available based on which of the critical tags are available. The tag map may be updated whenever a new system or new tags become available for monitoring.

The method also includes periodically displaying at least one of the available groups including the tag name and the sensor value for each tag in the group on an output display of the monitoring device 800 at step 922. Step 922 may include dynamically displaying at least the one available group with at least a second available group by obtaining the size of the output display, determining the size of each group, and organizing the groups within the display to minimize an amount of white space shown on the output display. Multiple sets of groups may be available for display. Step 922 may also include reviewing an input selection made at the monitoring device 800 to determine which set of groups to display on the output display. A second monitoring device 800 may be used to monitor the same or different turbomachinery concurrently with a first monitoring device 800 following the same or similar steps as provided herein.

In some embodiments, the method also includes recommending service to the turbomachinery system 50 or scheduling service for the turbomachinery system 50 based on, inter alia, the sensor data provided.

Figure 9:
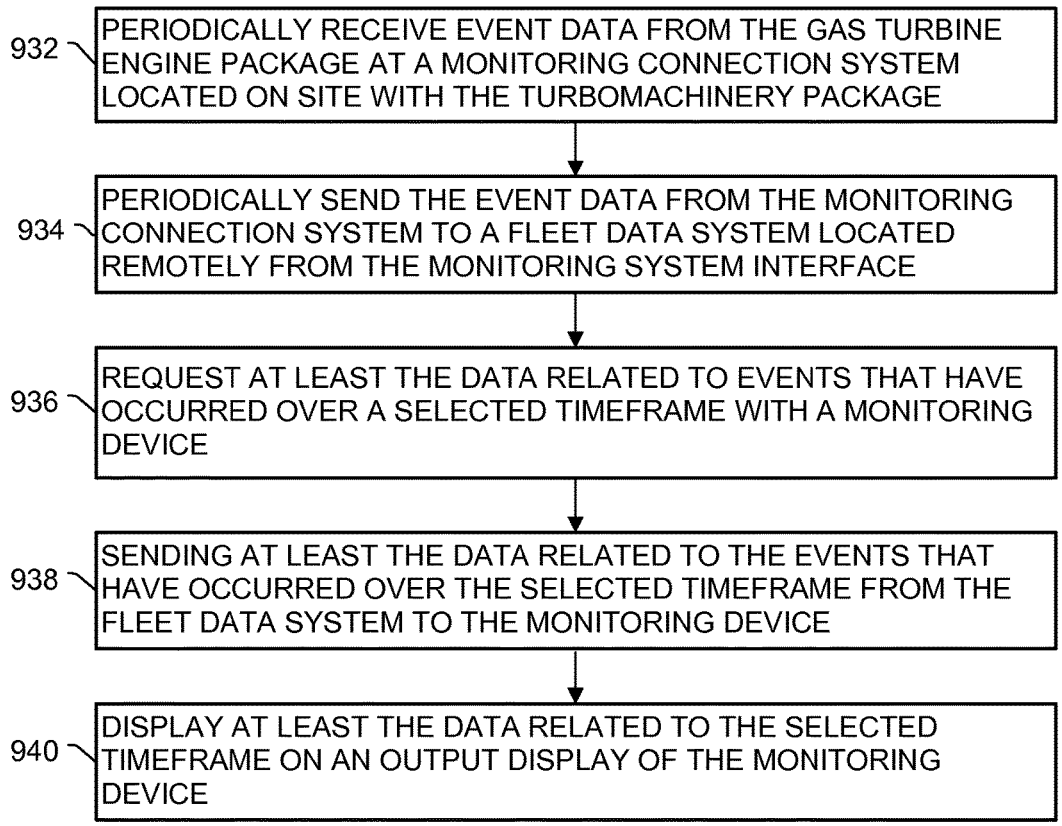
FIG. 9 is a flowchart of a method for monitoring events for turbomachinery, such as the gas turbine engines of FIGS. 1 and 2.

FIG. 9 is a flowchart of a method for monitoring events for turbomachinery, such as the gas turbine engines 100 of FIGS. 1 and 2. The method includes periodically receiving event data from the turbomachinery package 60 at a monitoring connection system 710 located on site with the turbomachinery package 60 at step 932. The event data may include data for events related to systems and sub-systems associated with the turbomachinery package 60. The event data along with any other data received from the turbomachinery package 60 may pass through the firewall 650 to prevent remote access to the turbomachinery package 60. The event data may include multiple tags that include a tag name, a unique identifier, and a Boolean value that represents the current status of the event. In some embodiments, a single site includes multiple turbomachinery packages 60.

Step 932 may include receiving the event data from multiple turbomachinery packages 60 concurrently.

The method also includes periodically sending the event data from the monitoring connection system 710 to a fleet data system 760 located remotely from the monitoring connection system 710 at step 934. The fleet data system 760 may be located at a data center 705. The event data may include every event tag and the status of each event or may only include those event tags that include a status that has recently changed. Step 934 may include storing the event data for a predetermined period. Step 934 may also include the fleet data system 760 receiving the event data for multiple turbomachinery packages 60 from one or more monitoring connection systems 710.

The method further includes requesting at least the data related to events that have occurred over a selected timeframe with a monitoring device 800 at step 936. The selected timeframe may be equal to or shorter than the predetermined timeframe. The method yet further includes sending at least the data related to the events that have occurred over the selected timeframe from the fleet data system 760 to the monitoring device 800 at step 938. In some embodiments, the data related to the predetermined timeframe is requested and sent. In other embodiments, only the data related to the selected timeframe is requested and sent.

The method still further includes displaying at least the data related to the selected timeframe on an output display of the monitoring device 800 at step 940. In some embodiments, step 940 includes the monitoring device 800 filtering the data related to the predetermined timeframe to only display the results related to the selected timeframe. A second monitoring device 800 may be used to monitor the same or different turbomachinery concurrently with a first monitoring device 800 following the same or similar steps as provided herein.

In some embodiments, the method also includes recommending service to the turbomachinery system 50 or scheduling service for the turbomachinery system 50 based on, inter alia, the event data provided.

Figure 10:
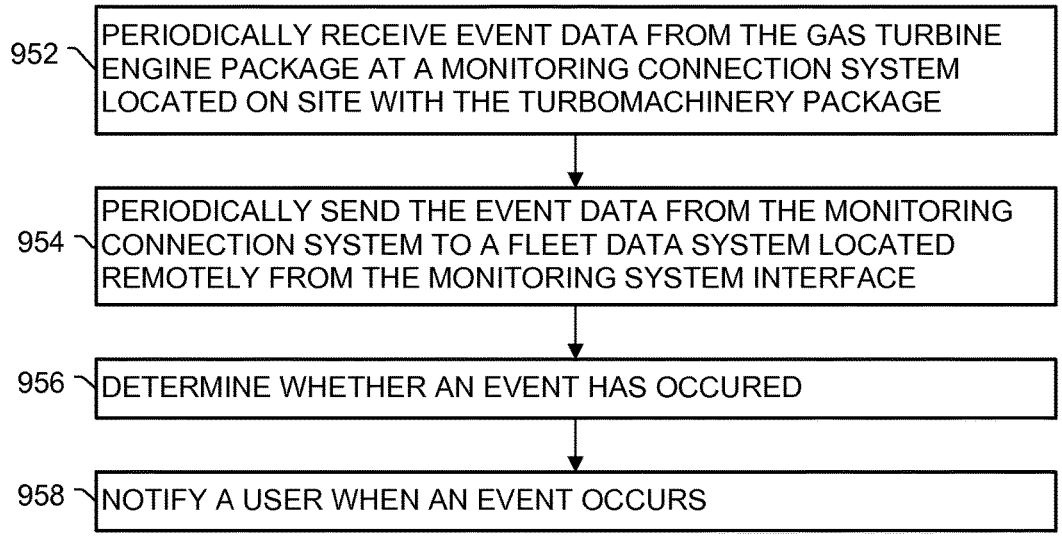
FIG. 10 is a flowchart of an alternate embodiment of a method for monitoring events for turbomachinery, such as the gas turbine engines 100 of FIGS. 1 and 2.

FIG. 10 is a flowchart of an alternate embodiment of a method for monitoring events for turbomachinery, such as the gas turbine engines 100 of FIGS. 1 and 2. The method includes periodically receiving event data from the turbomachinery package 60 at a monitoring connection system 710 located on site with the turbomachinery package 60 at step 952. The event data may include data for events related to systems and sub-systems associated with the turbomachinery package 60. The method may include passing the event data along with any other data received from the turbomachinery package through the firewall 650 to prevent remote access to the turbomachinery package 60. The event data may include multiple tags that include a tag name, a unique identifier, and a Boolean value that represents the current status of the event. In some embodiments, a single site includes multiple turbomachinery packages 60. Step 952 may include receiving the event data from multiple turbomachinery packages 60 concurrently.

The method also includes sending the event data from the monitoring connection system 710 to a fleet data system 760 located remotely from the monitoring connection system 710 at step 954. The fleet data system 760 may be located at a data center 705. The event data may include every event tag and the status of each event or may only include those event tags that include a status that has recently changed. Step 954 may also include the fleet data system 760 receiving the event data for multiple turbomachinery packages 60 from one or more monitoring connection systems 710. Steps 932 and 952 may be a single step performed for both the method of FIG. 9 and the method of FIG. 10 concurrently. Similarly, steps 934 and 954 may be a single step performed for both the method of FIG. 9 and the method of FIG. 10.

The method further includes the fleet data system 760 determining whether an event has occurred at step 956. Step 956 may include comparing the event status, such as a Boolean value, of the most recently received event data with the event status of the event data received in the period prior to the most recently received event data for each tag in the event data. Comparing the event status may include checking for Boolean values in the tags that change from a value that represents an inactive state to a value that represents an active state.

The method further includes notifying a user when an event occurs at step 958. Step 958 may also include notifying the user by pushing the notification to a monitoring device 800 and displaying the notification on an output display of the monitoring device 800, notifying the user by sending the user an email of the notification, notifying the user by sending a user a text message including the notification, or by sending any combination of the three types of notifications. In embodiments, the notification is sent when the Boolean values in the tag for an event changes from an inactive to an active state. The fleet data system 760 may send the event data to the monitoring device 800 for at least events that have occurred within the selected timeframe and when the event data includes data related to an active event.

The method may also include selecting which types of notifications to receive. The method may further include selecting how the notifications will be received. The monitoring device 800 may be used to select which notification types to receive and to select how the notifications are sent to the user. The monitoring device 800 may send those selections to the fleet data system 760 and stored in the fleet data store 766.

In some embodiments, the method includes sending service recommendations, maintenance schedules, and reminders to the monitoring device 800. These recommendations, schedules and reminders may be initiated by NRMI module 780 or by an authorized user, such as a fleet manager or an engineer.

Figure 11:
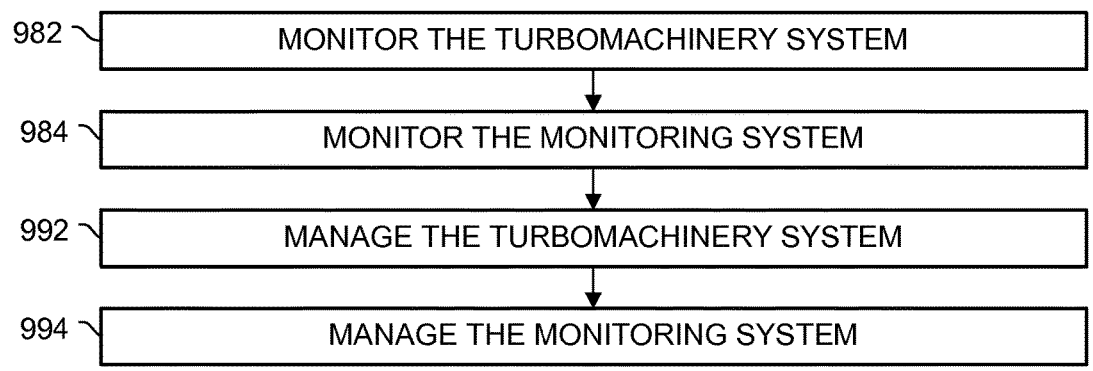
FIG. 11 is a flowchart of a method for remote management of the turbomachinery systems 50 and the monitoring system 700 of FIG. 1.

FIG. 11 is a flowchart of a method for remote management of the turbomachinery systems 50 and the monitoring system 700 of FIG. 1. The method includes monitoring the turbomachinery system 50 at step 982. Step 982 may include monitoring and diagnosing the network connectivity of the turbomachinery system 50, such as the connectivity of the monitoring connection system 710 to an external network, such as the internet. Step 982 may also include monitoring and diagnosing the data acquisition of the monitoring connection system 710 from the turbomachinery package 60 and the data acquisition of, inter alia, the controller 610 from the sensors of the turbomachinery system 50. Step 982 may further include monitoring and diagnosing the performance of the monitoring connection system 710, such as the CPU utilization and disk usage of the monitoring connection system 710. Step 982 may also include monitoring and diagnosing one or more of the systems and subsystems of the turbomachinery system 50. Monitoring the systems and subsystems of the turbomachinery system 50 may include analysis of the sensor data, the event data, the network connectivity status, and the data acquisition status.

The method also includes monitoring the monitoring system 700 at step 984. Step 984 may include monitoring and diagnosing the data posting of the sensor data and the event data at the monitoring system data provider 720 and the fleet data system 760 respectively. Step 984 may also include monitoring and diagnosing, inter alia, the operations of the monitoring system data provider 720, the monitoring system servers 740, and the fleet data system 760. Step 984 may further include monitoring and diagnosing the availability of the service to the monitoring devices 800, such as the availability of the sensor data for the liveview module 810, the availability of the event data for the device events module 830, and whether the NN module 764 is sending notifications to the monitoring devices 800.

The method further includes managing the turbomachinery system 50 at step 992. Step 992 may include troubleshooting, updating, and maintaining the monitoring connection system 710. Updating the monitoring connection system 710 may include pushing an update to the monitoring connection system 710 and updating the connection system module 712, such as by onboarding the update from the NRMI module 780 to the monitoring connection system 710. The update may include, inter alia, an update to the configuration of the connection system module 712 or a software update to the connection system module 712. Step 992 may also include the remote initial set up of the connection system module 712. Step 992 may also include troubleshooting, updating, and maintaining the data acquisition of the monitoring connection system 710 and the control system 600. Step 992 may further include troubleshooting, updating, and maintaining the turbomachinery system 50. Updating and maintaining the turbomachinery system 50 and the data acquisition of the monitoring connection system 710 and the control system 600 may include recommending, scheduling, and performing service on the turbomachinery system 50.

The method yet further includes managing the monitoring system 700 at step 994. Step 994 may include troubleshooting, updating, and maintaining, inter alia, the monitoring system data provider 720, the monitoring system servers 740, and the fleet data system 760. The updates may be provided directly or may be provided by the DRMI module 880. Step 994 may also include troubleshooting, updating, and maintaining the monitoring devices 800. Updating and maintaining the monitoring devices 800 may include providing updates of the liveview module 810, the device events module 830, and the DN module 850 to each of the monitoring devices 800.

Remote management of the monitoring connection system 710 may be limited to preselected authorized users. The method may further include authenticating the monitoring device 800 to determine whether the user is authorized to access the connection system module 712 and update the connection system module 712.

The various methods disclosed herein can each be performed concurrently. Those of skill will appreciate that the various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the invention. In addition, the grouping of functions within a module, block, or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. The illustrative logical blocks and modules may include the controller 610 including the control module 612 and the mapping module 614, the HMI 620 including the HSR 630, the event module 632, the analog module 634, the monitoring connection system 710 including the connection system module 712, the connection system gateway 714, the monitoring system servers 740, the fleet data system 760, the DRMI module 880, the monitoring device 800 including the liveview module 810, the device events module 830, the DRMI module 880, and the like. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor (e.g., of a computer), or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art.

What is claimed is:

1. A method of monitoring a plurality of turbomachines, the method comprising:
    a first monitoring connection system periodically receiving first event data from a first control system for a first turbomachine of the plurality of turbomachines;
    a second monitoring connection system periodically receiving second event data from a second control system for a second turbomachine of the plurality of turbomachines;
    a fleet data system receiving the first event data from the first monitoring connection system and associating one or more tags with the first event data and receiving the second event data from the second monitoring connection system and associating one or more tags with the second event data;

the fleet data system determining from the first event data and the second event data whether an event has occurred including comparing the event status for each tag associated with each event type in the most recently received of the first event data and the second event data with the event status for each tag in the first event data and the second event data received in the period prior to the most recently received of the first event data and the second event data and wherein the event status is a Boolean value and comparing the event status for each of the tags in the first event data and the second event data includes checking for Boolean values in the tags that change from a first value that represents an inactive state to a second value that represents an active state; and the fleet data system issuing an alert when the fleet data system has determined that the event has occurred, the alert including an event name, an event status, and a timestamp related to when the event occurred.

2. The method of claim 1, wherein the fleet data system sends the alert to a monitoring device using a push notification.

3. The method of claim 1, wherein the fleet data system sends the alert to a monitoring device via a short message service.

4. The method of claim 1, wherein the fleet data system sends the alert to a monitoring device using a push notification and via a short message service.

5. The method of claim 1, wherein the first monitoring connection system periodically receiving the first event data from the first control system includes passing the first event data through a read only firewall to prevent remote access to the first turbomachine.

6. A method of monitoring a plurality of turbomachinery systems, each including a controller connected to a control system, the method comprising:
    a fleet data system receiving event data periodically from the monitoring connection system of each turbomachinery system of the plurality of turbomachinery systems, the event data comprises a tag for each event type, each tag including a tag name and an event status;
    the fleet data system storing the event data for a predetermined period;
    the fleet data system determining from the event data received for each turbomachinery system whether an event has occurred by comparing the event status for each of the tags of the most recently received event data with the event status for each of the tags of the event data received in the period prior to the most recently received event data, wherein the event status is a Boolean value and comparing the event status for each tag in the event data includes checking for Boolean values in the tags that change from a first value that represents an inactive state to a second value that represents an active state; and
    the fleet data system issuing an alert when the fleet data system determines that the event has occurred, the alert including an event name, an event status, and a timestamp related to when the event occurred.

7. The method of claim 6, wherein the fleet data system sends the alert to a monitoring device using a push notification.

8. The method of claim 6, the fleet data system sends the alert to a monitoring device via a short message service.

9. The method of claim 6, wherein the fleet data system sends the alert to a monitoring device using a push notification and via a short message service.

10. A system for monitoring a plurality of turbomachinery systems, each including a controller that periodically provides information to a control system, the system comprising:
    a first monitoring connection system that periodically receives first event data from a first control system;
    a second monitoring connection system that periodically receives second event data from a second control system;
    wherein the first event data and the second event data include a tag for each event type, each tag including a tag name and an event status; and
    a fleet data system that receives the first event data over a network from the first monitoring connection system and the second event data over the network from the second monitoring connection system, the fleet data system including
        a network notification module that determines from the first event data and the second event data whether an event has occurred by comparing the event status of the tags for the most recently received first event data and second event data with the event status of the tags for the first event data and the second event data received in the period prior to the most recently received event data for each of the tags in the first event data and the second event data and issues an alert to a monitoring device when the fleet data system has determined that the event has occurred, the alert including an event name, an event status, and a timestamp related to when the event occurred,
        wherein the event status is a Boolean value and the network notification module checks for Boolean values in the tags that change from a value that represents an inactive state to a value that represents an active state to compare the event status for each of the tags.

11. The system of claim 10, wherein the network notification module sends the alert to the monitoring device using a push notification.

12. The system of claim 10, wherein the network notification module sends the alert to the monitoring device via a short message service.

13. The system of claim 12, wherein the network notification module sends the alert to the monitoring device using a push notification and a short message service.

14. The system of claim 10, wherein the monitoring device includes a device notification module that instructs the network notification module on how to send the alert to the monitoring device.

* * * * *